(No Model.)
F. KARRER.
CAR COUPLING.
No. 405,360. Patented June 18, 1889.
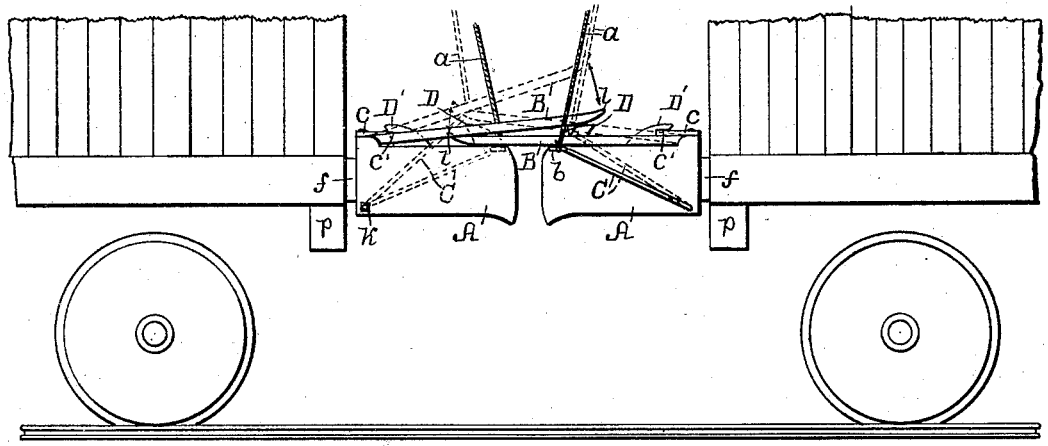
Fig. 1.
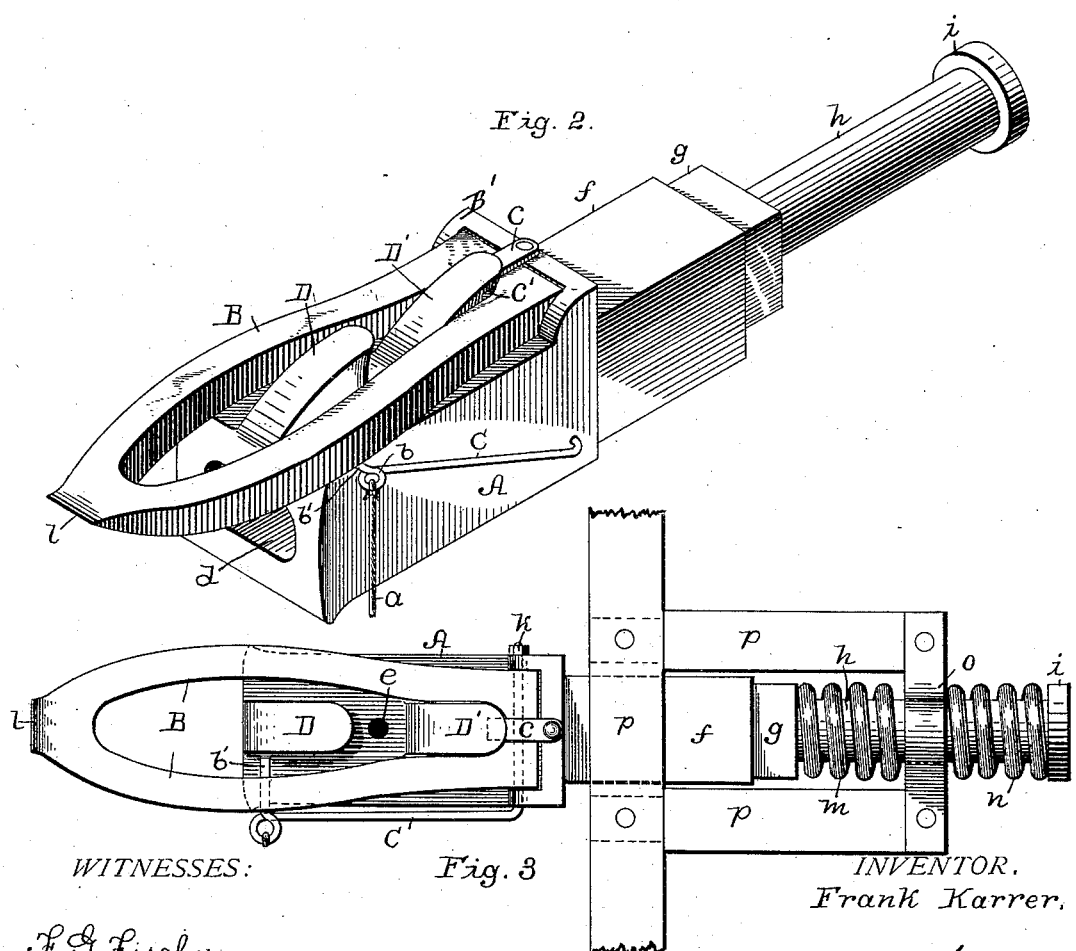
Fig. 2.
Fig. 3.
WITNESSES:
F. G. Fischer
A. A. Higdon
INVENTOR.
Frank Karrer.
By J. C. Higdon
his Attorney.

UNITED STATES PATENT OFFICE.

FRANK KARRER, OF RICH HILL, MISSOURI.

CAR-COUPLING.

SPECIFICATION forming part of Letters Patent No. 405,360, dated June 18, 1889.

Application filed April 16, 1889. Serial No. 307,427. (No model.)

*To all whom it may concern:*

Be it known that I, FRANK KARRER, of Rich Hill, Bates county, Missouri, have invented certain new and useful Improvements in Car-Couplings, of which the following is a full, clear, and exact description, reference being had to the accompanying drawings, forming a part hereof.

This invention relates to certain improvements in car-couplings, having for their object the automatic coupling and ready uncoupling of the cars without requiring the operator or train-man to pass in between the cars for that purpose; and to these ends the nature of the invention consists of the novel combination of parts and their construction, as will appear from the following description and illustration, in which—

Figure 1 is a side elevation of two cars having portions broken away embodying my invention. Fig. 2 is an enlarged detailed perspective view of the same, and Fig. 3 is an enlarged detailed plan view thereof.

In the organization of my invention I employ a draw-head A, which has a shoulder $f$ at its inner or rear end, and in rear of this shoulder is a lesser shoulder $g$. Extending inward from or in rear of the shoulder $g$ is a rod or cylindric portion $h$, formed with a shoulder or collar $i$ at its extreme inner or rear end. The step-like shouldered and cylindric portion of the draw-head thus formed fits in a frame $p$, secured, as usual, to the under side of the car. The cylindric portion $g$ passes through the rear cross-bar $o$ of the frame $p$, and is encircled upon each side of said cross-bar $o$ by a spring $m$ $n$, to possess the draw-head of the required yielding movement to break the concussion which would otherwise ensue from the contact of two meeting draw-heads.

B is the coupling-link, which is rectangular at its inner or rear end, which is seated in a corresponding recess or socket B′, formed upon the upper surface of the draw-head at its rear or inner end. The link B is retained in said seat or socket by means of a hook D′, formed upon said draw-head A, facing rearward, and a button $c$, pivoted upon the upper edge of the socket and engaging the under side of the beak of said hook, the button resting upon or above the rear or inner cross-bar of said link.

The rear cross-bar of the link B has sufficient play or movement between the hook D′ and the inner side of the seat B′ to permit it to freely turn as the forward end of the link is raised in passing over the forward side of the coupling-hook of the opposite draw-head to permit of the automatic coupling thereof, the forward edge of the link dropping down upon the front side of said hook, and thus engaging therewith. To permit the forward edge or end of the link B to glide or readily pass up the forward side of the hook D, it is beveled upon its under side, as at $l$.

C is the link adjusting or raising lever, having its lower end carried through and pivoted in the rear or inner end of the draw-head A, near the lower side thereof, being held therein by a nut $k$, applied to its end, projecting slightly from the opposite side of the draw-head, as seen in Fig. 3.

The upper forward end of the lever C has an inwardly-projecting arm or portion $b$, normally resting upon the draw-head and beneath the coupling-link B, thus holding the latter in a position to permit of the automatic coupling thereof with the coupling-hook of the opposite draw-head. The lever C is adapted to be conveniently operated by a chain or rope $a$, connecting with an eye $b$, formed at the angle between the lever and its arm $b$, said chain or rope in practice reaching up, it may be, to the roof of a box-car or other convenient point for its manipulation by the operator or train-man.

D is the coupling-hook, formed or cast upon the upper side of the draw-head A at its forward edge or end for engagement with the coupling-link of the opposite or meeting draw-head, as seen in Fig. 1.

It will be seen that this invention, as before intimated, is automatic in effecting the coupling operation, while in order to effect the uncoupling operation it is only necessary to pull upward upon the rope or chain $a$, when the link will be lifted from or taken out of engagement with the coupling-hook, and thus permit of the separation of the cars without requiring the operator or train-man to pass in between the cars, which, as is well understood, is seriously objectionable.

The invention is applicable to all kinds of cars—box-cars, flat cars, or passenger-cars.

Having thus fully described my invention, what I claim, and desire to secure by Letters Patent, is—

1. In a car-coupling, the combination, with the coupling-hook seated and held at its rear or inner end upon the draw-head, of the lever pivoted in said draw-head and having an arm resting upon said draw-head and beneath said link, and means to operate said lever, substantially as set forth.

2. The draw-head having upon its upper side at the forward edge a coupling-hook, the coupling-link having the inner or rear rectangular end resting and held in a corresponding seat or socket upon the upper side of the draw-head at its inner or rear end, the hook and button applied to the upper side of said draw-head to coact with said seat or socket to retain the coupling-link in position, and the link pivoted in said draw-head and having an arm resting under said coupling-link and upon the draw-head, together with the chain or rope to operate said lever, substantially as set forth.

In testimony whereof I affix my signature in presence of two witnesses.

FRANK KARRER.

Witnesses:
   GEO. P. HUCKEBY,
   W. O. ATKESON.